United States Patent
Bauer et al.

(10) Patent No.: US 7,056,555 B2
(45) Date of Patent: Jun. 6, 2006

(54) METHOD FOR COATING AN INTERNAL SURFACE OF AN ARTICLE WITH AN ALUMINUM-CONTAINING COATING

(75) Inventors: Steven Earl Bauer, Madisonville, KY (US); Gary Eugene Wheat, Madisonville, KY (US); Matthew David Saylor, Blanchester, OH (US); Jeffrey Allan Pfaendtner, Blue Ash, OH (US); Atul Natwerlal Shah, Peabody, MA (US)

(73) Assignee: General Electric Company, Schenectady, NY (US)

( * ) Notice: Subject to any disclaimer, the term of this patent is extended or adjusted under 35 U.S.C. 154(b) by 443 days.

(21) Appl. No.: 10/318,761

(22) Filed: Dec. 13, 2002

(65) Prior Publication Data

US 2004/0115355 A1 Jun. 17, 2004

(51) Int. Cl.
*B05D 7/22* (2006.01)
*B05D 3/02* (2006.01)
*B05D 3/12* (2006.01)

(52) U.S. Cl. .................... 427/239; 427/230; 427/376.1; 427/376.6; 427/383.1; 427/383.7; 427/378; 427/379; 427/380; 427/348

(58) Field of Classification Search ............. 427/376.1, 427/376.6, 383.1, 383.7, 379, 380, 378, 348, 427/230, 239

See application file for complete search history.

(56) References Cited

U.S. PATENT DOCUMENTS

| | | | |
|---|---|---|---|
| 3,779,719 A | | 12/1973 | Clark et al. |
| 3,801,357 A | | 4/1974 | Baldi |
| 3,950,575 A | | 4/1976 | Kitayama et al. |
| 4,820,362 A | | 4/1989 | Baldi |
| 5,366,765 A | * | 11/1994 | Milaniak et al. ............. 427/229 |
| 5,807,428 A | | 9/1998 | Bose et al. |
| 5,824,366 A | * | 10/1998 | Bose et al. .................. 427/239 |
| 6,110,262 A | * | 8/2000 | Kircher et al. ............ 106/14.44 |

\* cited by examiner

*Primary Examiner*—Michael Barr
(74) *Attorney, Agent, or Firm*—Gregory D. Garmong; Jonathan P. Miller; McNees Wallace & Nurick LLC

(57) ABSTRACT

An article having an internal passage therein and an internal article surface is coated by providing a coating slurry that is a mixture of a deposition source including a source of aluminum, a halide activator, and a flowable carrier comprising a flowable compound selected from the group consisting of a flowable organic compound and a flowable inorganic compound. There is no oxide dispersant in the coating slurry. The coating slurry is introduced into the internal passage and dried to remove at least a portion of the carrier therefrom and leave a dried coating material. The article surface in gaseous communication with the dried coating material is heated to form an aluminum-containing coating bonded to the article surface. Any residual dried coating material is removed by blowing compressed air through the internal passage.

20 Claims, 2 Drawing Sheets

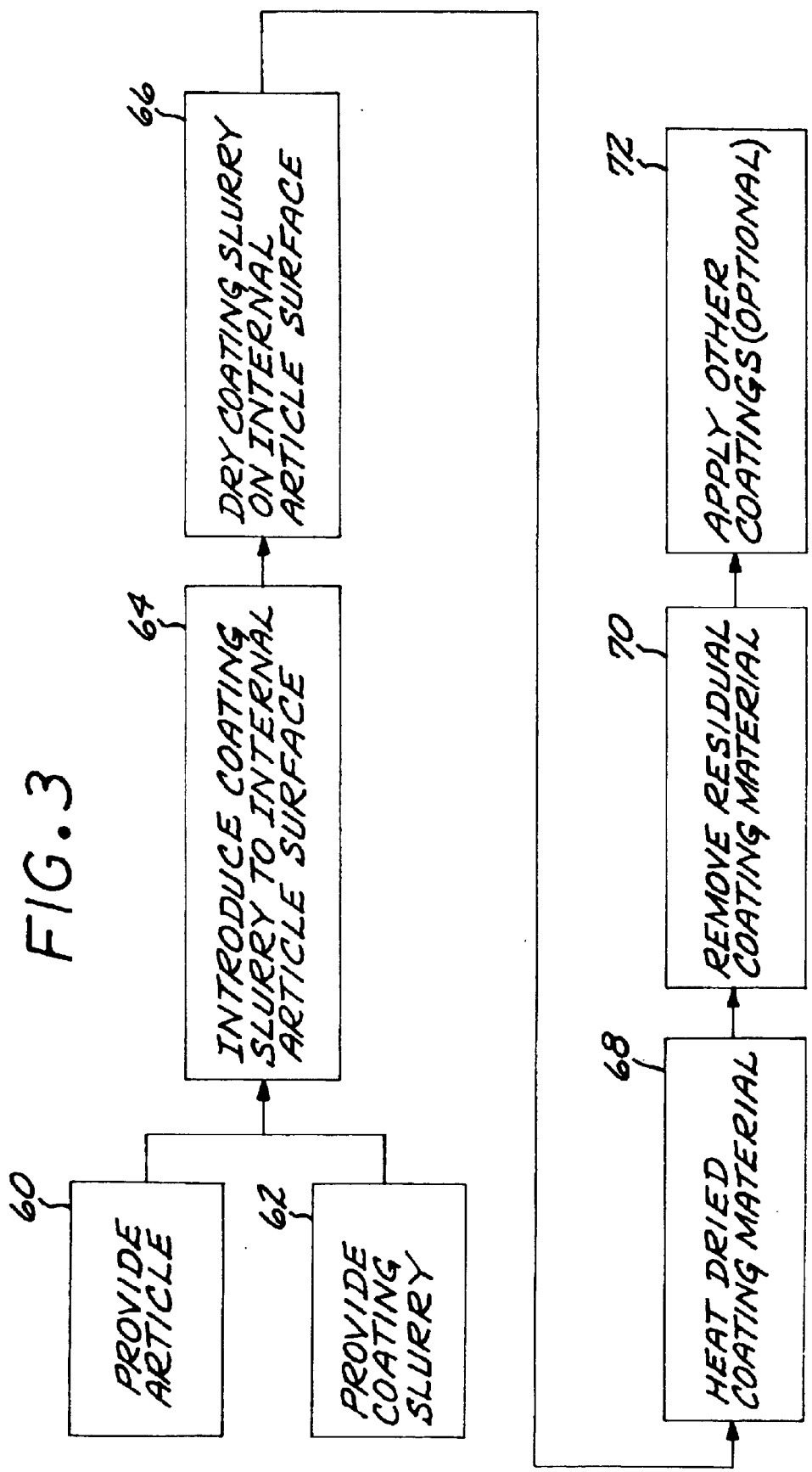

METHOD FOR COATING AN INTERNAL SURFACE OF AN ARTICLE WITH AN ALUMINUM-CONTAINING COATING

This invention relates to the application of an aluminum-containing coating to a surface, and in particular to the application of such a coating from an aluminum-containing slurry onto an internal surface of a gas turbine airfoil.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor and fan. In a more-complex version of the gas turbine engine, the compressor and a high pressure turbine are mounted on one shaft, and the fan and low pressure turbine are mounted on a separate shaft. In any event, the hot exhaust gases flow from the back of the engine, driving it and the aircraft forward.

The hotter the combustion and exhaust gases, the more efficient is the operation of the jet engine. There is thus an incentive to raise the combustion and exhaust gas temperatures. The maximum temperature of the combustion gases is normally limited by the materials used to fabricate the turbine vanes and turbine blades of the turbine, upon which the hot combustion gases impinge. In current engines, the turbine vanes and blades are made of nickel-based superalloys, and can operate at temperatures of up to about 1900–2150° F.

Many approaches have been used to increase the operating temperature limits of the airfoil portions of gas turbine blades and vanes to their current levels. For example, the composition and processing of the base materials themselves have been improved, and a variety of solidification techniques have been developed to take advantage of oriented grain structures and single-crystal structures.

Physical cooling techniques may also be used. In one technique, internal cooling passages are present in the interior of the gas turbine airfoil. Air is forced through the cooling passages and out cooling openings at the external surface of the airfoil, removing heat from the interior of the airfoil and, in some cases, providing a boundary layer of cooling air at the surface of the airfoil.

The surfaces of the internal cooling passages may be protected with a diffusion aluminide coating, which oxidizes to an aluminum oxide protective scale that inhibits further oxidation and hot corrosion of the internal surfaces. A number of techniques for applying the internal diffusion aluminide coating are known, including chemical vapor deposition, vapor-phase aluminiding, and above-the-pack techniques. These approaches have the drawback that they also coat other exposed surfaces. Surfaces which are not to be coated may sometimes be protected by masking, but masking may not be practical in many circumstances. They also may require extensive plumbing arrangements in some cases to conduct the aluminiding gas to the internal surface to be coated, and in some cases the required plumbing arrangement cannot be achieved.

In another technique, a coating slurry containing a source of aluminum, a halide activator, and an oxide dispersant is applied to the internal surface. The slurry coating is chemically reacted to deposit aluminum on the internal surface. Slurry coating has the advantage that the spatial extent of the aluminum-containing coating may be limited to specific areas such as the internal surfaces. However, existing slurry-coating techniques have the drawback that they may leave undesirable contamination on the internal article surface of the blade in the form of residual components of the coating slurry. The residual components may be cleaned out of the narrow passages only with great difficulty, using high-pressure water jets, ultrasonic energy, and the like.

There is therefore a need for an improved approach to the depositing of aluminum-containing coatings on specific areas of surfaces, particularly the internal surfaces of articles such as gas turbine airfoils. The present invention fulfills this need, and further provides related advantages.

BRIEF SUMMARY OF THE INVENTION

The present approach provides a method for coating a surface of an article with an aluminum-containing coating. It is particularly well suited for coating the internal surfaces of articles, such as the internal surfaces of the passages within hollow airfoils of gas turbine blades and vanes. The present approach has the advantages of conventional slurry-coating processes. Additionally, the slurry is formulated to facilitate the removal of residual, excess coating material from the surfaces following the coating procedure. The external surface of the article may be coated with the same or a different coating, in the same or a different thermal cycle as the internal surface is coated.

A method of coating comprises the steps of providing an article having an internal passage therein and an internal article surface to be coated, and providing a coating slurry comprising a mixture of a deposition source comprising a source of aluminum, a halide activator, and a carrier comprising a flowable compound selected from the group consisting of a flowable organic compound and a flowable inorganic compound. There is no oxide dispersant in the coating slurry.

The coating slurry mixture preferably contains from about 5 to about 40 percent by weight of the source of aluminum, from about 1 to about 8 percent by weight of the halide activator, and the balance the flowable compound. The source of aluminum is preferably a metallic powder and is most preferably iron-aluminum powder, titanium-aluminum powder, chromium-aluminum powder, or cobalt-aluminum powder, or a mixture thereof. The halide activator is preferably selected from the group consisting of ammonium fluoride, ammonium chloride, sodium fluoride, sodium chloride, sodium bromide, sodium iodide, potassium fluoride, potassium chloride, potassium bromide, potassium iodide, aluminum fluoride, and aluminum chloride, and mixtures thereof.

The coating slurry is introduced into the internal passage and into contact with the internal article surface, preferably by injecting it into the internal passage. The method further includes thereafter drying the coating slurry on the internal article surface to remove at least a portion of the carrier therefrom and to leave a dried coating material, and thereafter heating the article surface in gaseous communication with the dried coating material to form an aluminum coating bonded to the internal article surface. The drying step is preferably accomplished by heating the coating slurry to a drying temperature of from about 140° F. to about 160° F. in air, for a time of from about 2 to about 4 hours. The heating step is preferably accomplished by heating the internal article surface with the dried coating material in gaseous communication therewith to a deposition temperature of from about 1600° F. to about 2100° F. for a time of from about 4 to about 8 hours, in an inert or reducing atmosphere that has no oxygen and no water vapor therein. The resulting aluminum-containing coating is preferably from about 0.0005 inch to about 0.005 inch thick.

After the step of heating, any residual coating material may be readily removed from the internal article surface. The residual coating material may be removed by blowing compressed air through the internal passage to blow residual coating material from the internal article surface and from the internal passage. The ability to easily remove the residual coating material with compressed air is to be contrasted with the usual difficulties found in removing residual coating materials from internal passages coated using conventional slurry and foam coating techniques. The internal passages and cooling openings may be very small, as small as about 0.011 inch in diameter in some cases, and may be serpentine in form. Removing the residual coating material in conventional coating slurry techniques has required extensive soaking of the article, the use of high-pressure water jets, application of ultrasonic energy, and other removal techniques. In the present approach, by contrast, the residual coating material is usually removed using just a blast of compressed air directed through the internal passage, although further cleaning may be employed as desired.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 3 is a block flow diagram of an approach for preparing an internally coated gas turbine airfoil.

DETAILED DESCRIPTION OF THE INVENTION

Figure 1:
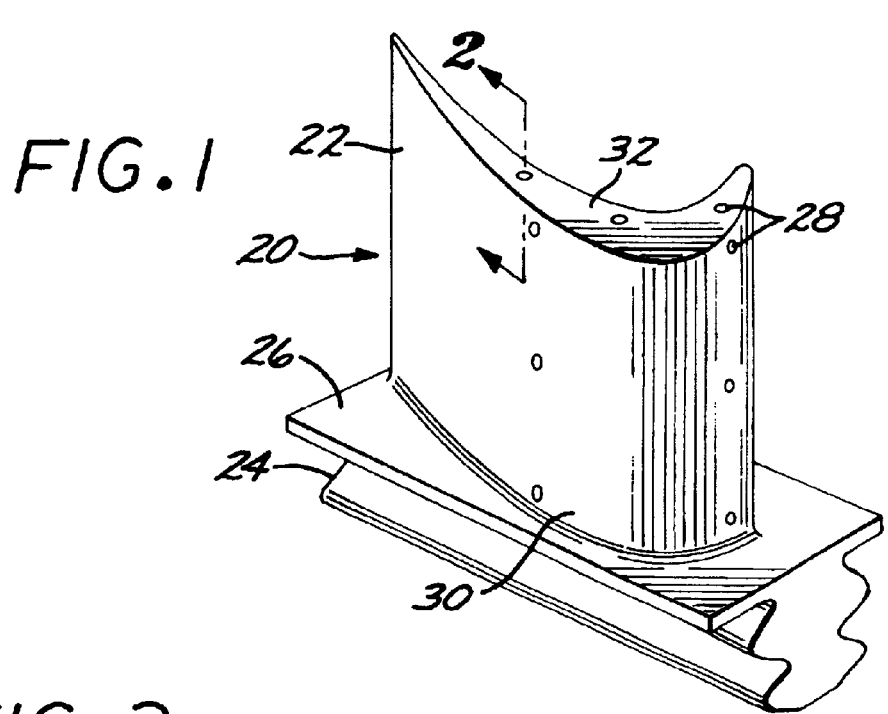
FIG. 1 is a perspective view of a turbine blade.

FIG. 1 depicts a component article of a gas turbine engine such as a turbine blade or a turbine vane, and in this illustration a turbine blade 20. The turbine blade 20 is formed of any operable material, but is preferably a nickel-base superalloy. The turbine blade 20 includes an airfoil section 22 against which the flow of hot exhaust gas is directed. (The turbine vane has a similar appearance in respect to the pertinent airfoil section, but typically includes other end structure to support the airfoil.) The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. The airfoil 22 may be described as having a root end 30 adjacent to the dovetail 24, and an oppositely disposed tip end 32 remote from the dovetail 24. A number of internal passages extend through the interior of the airfoil 22, ending in cooling openings 28 in the surface of the airfoil 22. During service, a flow of cooling air is directed through the internal passages, usually from the root end 30 toward the tip end 32, to reduce the temperature of the airfoil 22, and the cooling air flows out of the cooling openings 28.

Figure 2:
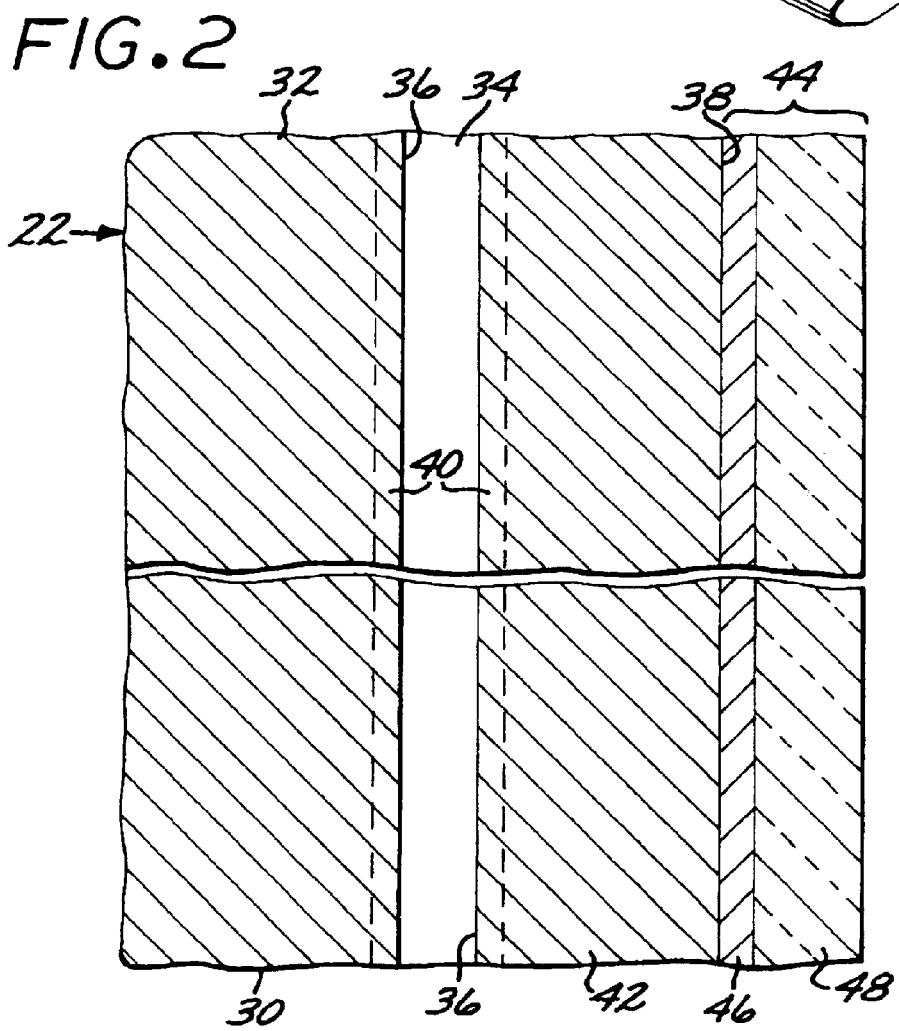
FIG. 2 is an enlarged schematic sectional view through the turbine blade of FIG. 1, taken on lines 2—2.

FIG. 2 is a longitudinal section through the airfoil 22, showing one of the internal passages 34 extending through an interior of the airfoil 22. The internal passage 34 has an internal airfoil surface 36, and there is also an external airfoil surface 38 of the metallic portion of the airfoil 22.

A diffusion aluminide protective region 40 is present at the internal airfoil surface 36. The diffusion aluminide protective region 40 is formed by depositing an aluminum-containing coating onto the internal airfoil surface 36, so that a body of the airfoil 22 serves as a substrate 42. The aluminum is interdiffused with the base material of the substrate 42 to form the aluminum-enriched protective region 40 lying below the internal airfoil surface 36. The diffusion aluminide protective region 40 has a composition with the aluminum concentration highest near the internal airfoil surface 36, and with decreasing aluminum concentration with increasing distance into the substrate 42 from the internal airfoil surface 36. The diffusion aluminide protective region 40 is typically from about 0.0005 to about 0.005 inch thick. When exposed to a high-temperature oxidizing environment, the aluminum-enriched region at the internal airfoil surface 36 oxidizes to form a highly adherent aluminum oxide (alumina, or $Al_2O_3$) protective scale at the internal airfoil surface 36, inhibiting and slowing further oxidation damage. Aluminide-modifying elements such as hafnium, zirconium, yttrium, silicon, titanium, tantalum, tungsten, molybdenum, rhenium, ruthenium, cobalt, chromium, platinum, and palladium, and combinations thereof, may optionally be present in the diffusion aluminide protective region 40. An overlay coating such as discussed next and applied to the external airfoil surface 38 is not used on the internal airfoil surface 36.

The external airfoil surface 38 may also be protected, and FIG. 2 illustrates one approach. A protective coating 44 overlies and contacts the external airfoil surface 38. The protective coating 44 includes a protective layer 46 overlying and contacting the external airfoil surface 38. The protective layer 46 is preferably formed of a diffusion aluminide or an overlay composition. When used, the diffusion aluminide coating may be a simple diffusion aluminide of the type discussed earlier, or a modified diffusion aluminide such as a platinum aluminide. Such coatings are known in the art for the case of external protective layers 46. When used, the overlay protective coating is preferably of the MCrAlX type. The terminology "MCrAlX" is a shorthand term of art for a variety of families of overlay protective layers 46 that may be employed as environmental coatings or bond coats in thermal barrier coating systems. In this and other forms, M refers to nickel, cobalt, iron, and combinations thereof. In some of these protective coatings, the chromium may be omitted. The X denotes elements such as hafnium, zirconium, yttrium, tantalum, rhenium, ruthenium, palladium, platinum, silicon, titanium, boron, carbon, and combinations thereof. Specific compositions are known in the art. The protective layer 46 is from about 0.0005 to about 0.010 inch thick. Such protective layers 46 are generally known in the art.

Optionally, a ceramic layer 48 overlies and contacts the protective layer 46. The ceramic layer 48 is preferably yttria-stabilized zirconia, which is zirconium oxide containing from about 2 to about 12 weight percent, preferably from about 6 to about 8 weight percent, of yttrium oxide. The ceramic layer 48 is typically from about 0.003 inch to about 0.010 inch thick. Other operable ceramic materials may be used as well. When there is no ceramic layer 48 present, the protective layer 46 is termed an "environmental coating". When there is a ceramic layer 48 present, the protective layer 46 is termed a "bond coat".

FIG. 3 depicts a preferred approach for practicing the present method. An article is provided, numeral 60, in this case an airfoil section 22 such as found in the turbine blade 20 or in a turbine vane. The article and thence the substrate 42 are preferably a nickel-base alloy, and more preferably are a nickel-base superalloy. A nickel-base alloy has more nickel than any other element, and an nickel-base superalloy is a nickel-base alloy that is strengthened by the precipitation of gamma prime or a related phase. Many nickel-base superalloys are known in the art, and the present approach is operable with these nickel-base superalloys.

A coating slurry is provided, numeral 62. The coating slurry comprises a deposition source comprising a source of aluminum, a halide activator, and a flowable carrier comprising a compound selected from the group consisting of a flowable organic compound and a flowable inorganic compound. There is no oxide dispersant in the coating slurry.

The source of aluminum is preferably an iron-aluminum powder, a titanium-aluminum powder, a chromium-aluminum powder, or a cobalt-aluminum powder, or a mixture of these powder. Examples include an alloy of iron and from about 50 to about 60 weight percent aluminum, an alloy of titanium and from about 30 to about 40 weight percent aluminum, an alloy of chromium and from about 30 to about 45 weight percent aluminum, and an alloy of cobalt and from about 40 to about 60 weight percent aluminum. An iron-aluminum alloy having about 44 percent by weight iron and 56 percent by weight aluminum is most preferred. The source of aluminum is preferably a powder, with a preferred powder size of 150 micrometers or smaller.

The source of aluminum may also contain modifying elements that are to be co-deposited with the aluminum. Examples of modifying elements include hafnium, zirconium, yttrium, chromium, silicon, tantalum, tungsten, molybdenum, rhenium, ruthenium, platinum, and palladium.

The halide activator is preferably ammonium fluoride, ammonium chloride, sodium fluoride, sodium chloride, sodium bromide, sodium iodide, potassium fluoride, potassium chloride, potassium bromide, potassium iodide, aluminum fluoride, and aluminum chloride, or mixtures thereof. Ammonium fluoride is most preferred.

The flowable carrier may include either a flowable organic compound or a flowable inorganic compound, or both. In a preferred formulation, the flowable carrier is a mixture of flowable organic compounds. Most preferably, the flowable carrier comprises an organic binder, about 11 percent by weight toluene, about 10 percent by weight acetone, balance de-ionized water. Any operable binder may be used. Examples of operable binders include, for example, the preferred acrylics such as polymethylmethacrylate (PMMA), butyl methacrylate resin, ethyl methacrylate resin, methyl methacrylate resin, and methacrylate co-polymer resin; and other, less preferred binders such as methyl cellulose; acrylic lacquer; alkyd resins such as phenolic-modified alkyd and phenolic-modified soybean alkyd; shellac; rosin; rosin derivatives; ester gum; vinyls; styrenics; polyesters; epoxides; polyurethanes; cellulose derivatives; and mixtures thereof.

There is an important negative consideration in preparing the coating slurry. There is substantially no oxide dispersant present. Other slurry coatings contain an oxide dispersant to aid in the coating process, but the present work has determined that the presence of an oxide dispersant in a coating slurry that is used to coat internal surfaces is a primary cause of the difficulty in removing the residual coating material at the conclusion of the coating operation. The oxide dispersant has been eliminated from the present coating slurry formulation.

The source of aluminum is preferably from about 5 to about 40, more preferably about 20 percent by weight of the total weight of the coating slurry; the halide activator is preferably from about 1 to about 8, more preferably about 4, percent by weight of the coating slurry; and the carrier is the balance of the coating slurry. The most preferred source of aluminum is an alloy of iron and 56 percent by weight aluminum, the most preferred halide activator is ammonium fluoride, and the most preferred carrier is the mixture of toluene, acetone, binder, and de-ionized water discussed above.

The constituents are mixed together to form the coating slurry. The mixture is preferably mixed for a time of about 5 to 15 minutes and then allowed to outgas for about 30 to 45 minutes before use. The resulting coating slurry has a viscosity like that of a warm syrup, although the viscosity may be altered as desired by changing the relative amount of the carrier.

The coating slurry is introduced into the internal passage 34, step 64. In the preferred case where the coating slurry is applied to the internal airfoil surfaces 36 of the internal passages 34, the coating slurry is injected into the internal passages 34 with a syringe and a pump.

The coating slurry injected into the internal passages 34 is dried, step 66. The dried coating slurry need not cover all of the internal article surface 36, because in a subsequent step aluminum is vapor-phase transported to all of the regions of the internal article surface 36. In a preferred case, the drying step 66 is accomplished by heating the coating slurry on the article surface to a temperature of from about 140° F. to about 160° F. in air, for a time of from about 2 to about 4 hours. The drying evaporates the flowable carrier component (e.g., flowable organic solvents and water) of the coating slurry, leaving the organic binder that binds the particles together. It is important that the aqueous and other flowable portion of the carrier be completely removed by drying, so that there is no residual water or other liquid in the internal passages 34.

The dried coating slurry is heated to deposit an aluminum-containing coating onto the surface of the article, step 68. This heating step 68 is preferably accomplished at a temperature of from about 1600° F. to about 2100° F., most preferably from about 1925° F. to about 2000° F., for a time of from about 4 to about 8 hours, in an inert (e.g., argon) or reducing (e.g., hydrogen) atmosphere. In the case of the inert atmosphere, the atmosphere is free of oxygen and oxygen-containing species such as water vapor.

In a common application of the present approach, the external airfoil surface 38 is vapor phase aluminided to produce an aluminum diffusion coating simultaneously with the deposition of the aluminum-containing coating on the internal airfoil surface 36. To accomplish this deposition, the article is placed into a vapor-phase aluminiding (VPA) or chemical vapor deposition (CVD) reactor containing the aluminiding vapors. In that case, the atmosphere of the heating step 68 will also contain the species that accomplish the vapor phase aluminiding of the external airfoil surface 38, typically aluminum halides such as aluminum fluoride.

The article is desirably protected against oxidation by residual oxygen and water vapor during this heating step 68. Optionally, the article may be wrapped in nickel foil, or other foil such as stainless steel, tool steel, tantalum, or nickel-base superalloy metal, to provide this protection. In this heating step, an aluminum-containing vapor is produced by the chemical reaction between the source of aluminum and the halide activator. The aluminum-containing vapor deposits on the internal surface, leaving the aluminum-containing coating. The coated article is thereafter cooled to room temperature.

The result of the heating step 68 is the internal surface 36 with the aluminum-containing layer 40. The aluminum-containing layer 40 partially interdiffuses into the substrate 42 during the heating step 68. The protective layer 46 is optionally present, if deposited.

Additionally, there is a residue on the internal airfoil surface 36, because not all of the original solids powder is reacted. The residue includes the unreacted portion of the source of the iron-aluminum metal and halide activator. This residual coating material is preferably removed, step 70. The removal is accomplished, even from a small-size, tightly confined, serpentine internal passage, by blowing with high-pressure air. Optionally, the removal step 70 may include ultrasonic cleaning in water or other cleaner or solvent.

Any other coatings are applied, step 72, although this further coating is optional. In the case of the turbine airfoil, a coating such as the coating 44 or a thermal barrier coating may be applied over the external airfoil surface 38 (if it has not been applied simultaneously with step 68). Any operable process for the selected external coating may be used, and step 72 may follow, precede, or be concurrent with step 68. Where used, the protective coating 44 is deposited overlying and contacting the external airfoil surface 38. The protective coating 44 includes the protective layer 46 deposited onto the external airfoil surface 38. The protective layer 46 is preferably either a diffusion aluminide of the same general type as applied to the internal surface, another diffusion aluminide coating, or an MCrAlX coating. The protective layer 46 is deposited by any operable technique, such as vapor phase aluminiding for the diffusion aluminide coating, or physical vapor deposition (e.g., sputtering, cathodic arc, electron beam) or thermal spray for the MCrAlX coating. The protective layer 46 is preferably from about 0.0005 to about 0.010 inch, most preferably from about 0.001 to about 0.005 inch, thick.

The protective coating 44 optionally includes the ceramic layer 48, deposited overlying and contacting the protective layer 46. The ceramic layer 48 is preferably from about 0.003 to about 0.010 inch thick, more preferably from about 0.005 to about 0.010 inch thick, and most preferably about 0.005 inch thick. (FIG. 2 is not drawn to scale.) The ceramic layer 48 is preferably yttria-stabilized zirconia, which is zirconium oxide containing from about 2 to about 12 weight percent, preferably from about 6 to about 8 weight percent, of yttrium oxide. Other operable ceramic materials may be used as well. It may be deposited by any operable technique, such as physical vapor deposition or thermal spray.

The present approach has been reduced to practice.

In a first example, an airfoil section of a hollow turbine vane to be used in a gas turbine engine was injected with the preferred coating slurry composition discussed above, and the slurry coating was dried. The turbine vane was subsequently heat treated in a vapor phase aluminiding coating cycle at 1975° F. for 6 hours using about 100–150 pounds of chromium-aluminum alloy pellets and 60 grams of ammonium fluoride activator. The average internal diffusion aluminide protective region 40 was about 0.0016 inches thick, and a protective layer 46 was simultaneously deposited on the external surface 38. The residue was readily removed from the internal passages.

In a second example, a hollow turbine blade used in a gas turbine engine was injected with the preferred coating slurry composition discussed above, and the slurry coating was dried. The turbine blade was subsequently heat treated in a vapor phase aluminiding coating cycle at 1975° F. for 6 hours using about 100–150 pounds of chromium-aluminum alloy pellets and 300 grams of aluminum fluoride activator. The average internal diffusion aluminide protective region 40 was about 0.0027 inches thick, and a protective layer 46 was simultaneously deposited on the external surface 38. The residue was readily removed from the internal passages.

In a third example, a hollow turbine blade used in a gas turbine engine was injected with the preferred coating slurry composition discussed above, except that aluminum fluoride activator was used instead of ammonium fluoride activator, and the slurry coating was dried. The turbine blade was subsequently heat treated in a vapor phase aluminiding coating cycle at 1975° F. for 6 hours using about 100–150 pounds of chromium-aluminum alloy pellets and 300 grams of aluminum fluoride activator. The average internal diffusion aluminide protective region 40 was about 0.0017 inches thick, and a protective layer 46 was simultaneously deposited on the external surface 38. The residue was readily removed from the internal passages.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of coating, comprising the steps of:
   providing an article having an internal passage therein and an internal article surface to be coated;
   providing a coating slurry comprising a mixture of
   a deposition source comprising a source of aluminum,
   a halide activator, and
   a flowable carrier comprising a compound selected from the group consisting of a flowable organic compound and a flowable inorganic compound, wherein there is no oxide dispersant in the coating slurry; thereafter
   introducing the coating slurry into the internal passage; thereafter
   drying the coating slurry on the internal article surface to remove at least a portion of the carrier therefrom and leave a dried coating material; and thereafter
   heating the article surface in gaseous communication with the dried coating material to form an aluminum-containing coating bonded to the internal article surface.

2. The method of coating of claim 1, wherein the step of providing the article includes the step of
   providing the article that comprises a gas turbine airfoil.

3. The method of claim 1, wherein the step of providing the coating slurry includes the step of
   providing the coating slurry as the mixture of from about 5 to about 40 percent by weight of the source of aluminum, from about 1 to about 8 percent by weight of the halide activator, balance the flowable compound.

4. The method of claim 1, wherein the step of providing the coating slurry includes the step of
   providing the source of aluminum selected from the group consisting of iron-aluminum powder, titanium-aluminum powder, chromium-aluminum powder, and cobalt-aluminum powder, and mixtures thereof.

5. The method of claim 1, wherein the step of providing the coating slurry includes the step of providing the halide activator selected from the group consisting of ammonium fluoride, ammonium chloride, sodium fluoride, sodium chloride, sodium bromide, sodium iodide, potassium fluoride, potassium chloride, potassium bromide, potassium iodide, aluminum fluoride, and aluminum chloride, and mixtures thereof.

6. The method of coating of claim 1, wherein the step of introducing includes the step of
injecting the coating slurry into the internal passage of the article.

7. The method of coating of claim 1, wherein the step of drying includes the step of
heating the coating slurry to a drying temperature of from about 140° F. to about 160° F. in air, for a time of from about 2 to about 4 hours.

8. The method of coating of claim 1, wherein the step of heating includes the step of
heating the dried coating slurry in a water-free atmosphere.

9. The method of coating of claim 1, wherein the step of heating includes the step of
heating the coating slurry in an aluminiding atmosphere.

10. The method of coating of claim 1, wherein the step of heating includes the step of
heating the coating slurry simultaneously with depositing a diffusion aluminide coating on an external article surface of the article.

11. The method of coating of claim 1, wherein the step of heating includes the step of
heating the internal article surface and the dried coating material to a deposition temperature of from about 1600° F. to about 2100° F. for a time of from about 4 to about 8 hours, in an inert or reducing atmosphere.

12. The method of claim 1, wherein the step of heating includes the step of
producing the aluminum-containing coating having a thickness of from about 0.0005 inch to about 0.005 inch.

13. The method of claim 1, including an additional step, after the step of heating, of
removing any residual coating material from the internal article surface.

14. The method of claim 1, including an additional step, after the step of heating, of
blowing compressed air through the internal passage to blow residual coating material from the internal article surface and from the internal passage.

15. A method of coating, comprising the steps of:
providing a gas turbine airfoil having an internal passage therein and an internal article surface to be coated;
providing a coating slurry comprising a mixture of
a deposition source comprising a source of aluminum, wherein the source of aluminum is an aluminum-containing metallic powder
a halide activator, and
a carrier comprising a flowable organic compound, wherein there is no oxide dispersant in the coating slurry; thereafter
injecting the coating slurry into the internal passage of the article; thereafter
drying the coating slurry on the internal article surface to remove at least a portion of the carrier therefrom and leave a dried coating material; thereafter
heating the internal article surface in gaseous communication with the dried coating material to a deposition temperature of from about 1600° F. to about 2100° F. for a time of from about 4 to about 8 hours, in a water-free inert or reducing atmosphere; and thereafter
blowing compressed air through the internal passage to blow residual coating material from the article surface and from the internal passage.

16. The method of claim 15, wherein the step of providing the coating slurry includes the step of
providing the coating slurry as the mixture of from about 5 to about 40 percent by weight of the source of aluminum, from about 1 to about 8 percent by weight of the halide activator, balance the flowable organic compound.

17. The method of claim 15, wherein the step of providing the coating slurry includes the step of
providing the source of aluminum selected from the group consisting of iron-aluminum powder, titanium-aluminum powder, chromium-aluminum powder, and cobalt-aluminum powder, and mixtures thereof.

18. The method of claim 15, wherein the step of providing the coating slurry includes the step of
providing the halide activator selected from the group consisting of ammonium fluoride, ammonium chloride, sodium fluoride, sodium chloride, sodium bromide, sodium iodide, potassium fluoride, potassium chloride, potassium bromide, potassium iodide, aluminum fluoride, and aluminum chloride, and mixtures thereof.

19. The method of claim 15, wherein the step of heating includes the step of
producing the aluminum-containing coating having a thickness of from about 0.0005 inch to about 0.005 inch.

20. A method of coating, comprising the steps of:
providing an article having an internal passage therein and an internal article surface to be coated;
providing a coating slurry comprising a mixture of
a deposition source comprising a source of aluminum, wherein the deposition source is selected from the group consisting of iron-aluminum powder, titanium-aluminum powder, chromium-aluminum powder, cobalt-aluminum powder, and mixtures thereof,
a halide activator selected from the group consisting of ammonium fluoride, ammonium chloride, sodium fluoride, sodium chloride, sodium bromide, sodium iodide, potassium fluoride, potassium chloride, potassium bromide, potassium iodide, aluminum fluoride, aluminum chloride, and mixtures thereof, and
a flowable carrier comprising a compound selected from the group consisting of a flowable organic compound and a flowable inorganic compound, wherein there is no oxide dispersant in the coating slurry; thereafter
introducing the coating slurry into the internal passage; thereafter
drying the coating slurry on the internal article surface to remove at least a portion of the carrier therefrom and leave a dried coating material; and thereafter
heating the article surface in gaseous communication with the dried coating material to a deposition temperature of from about 1600° F. to about 2100° F. to form an aluminum-containing coating bonded to the internal article surface.

* * * * *